A display area displays a subset of a set of items. Items may be the ancestor or descendant of one or more other items. As an ancestor item having one or more visible descendant items becomes not visible, for example by scrolling outside the display area, a proxy in the display area is automatically created. The proxy corresponds with the ancestor item not visible in the display area. Multiple proxies may be displayed in the display area to present a complete view of the hierarchy containing at least some of the items visible in the display area. Items that do not have descendant items visible in the display area will not generate corresponding proxies when they become not visible. Proxies may be active user interface elements. Conversely, if an ancestor item becomes visible in the display area, any corresponding proxies are automatically removed.

18 Claims, 14 Drawing Sheets

Name

☐ A-B  105f
☐ C    105g
☐ D-E  105h
▷ ☐ Daft Punk        105i
  ☐ Daisy Chainsaw   105j
  ☐ Dan Deacon
  ☐ Dan the Automator
  ☐ Dandy Warhols
  ☐ Danger Mouse
  ☐ Dark Side of the Moog
  ☐ Darkness
▷ ☐ David Bowie      105K
    ☐ 000-david_bowie-
    ☐ 000-david_bowie-
    ☐ 000-david_bowie-
  ▷ Bowie & NIN
    David Bowie - Best of
    David Bowie - Best of
    David Bowie - Best of
    David Bowie - Best of
    David Bowie - Best of
    David Bowie - Best of
    David Bowie - Best of
    David Bowie - Best of
    David Bowie - Best of
    David Bowie - Best of
    David Bowie - Best of
    David Bowie - Best of
    David Bowie - Best of ▲ ☐ Music Vault   — 220a
▲ ♪ Music         — 220b

```
neverlost.m
1   getready()
2
3   printf ('here we go!');
4
5   for (x =1; x < 1000; x++) {        805a
6
7       foo(x);
8
9       bar(x);
10
11      morestuff();
12
13      if (x %2 == 0){                805b
14
15          printf('x is even');
16
17          startmakingcoffee();
18
19          maketoast();
20
21          squeezeorangejuice();
22
23          getthehepaper();
24
25          y = x * y;
26
27          while (y < 100) {          805c
28              eatbreakfast();
29
30              readpaper();
31
32              thinkabouttheweekend();
33
34              listentotheradio();
35
36          } // end while
37
38      } // end if
39  } // end for
```

```
  29
  30   readpaper();
  31
  32   thinkabouttheweekend();
  33         810c
  34   listentotheradio();
  35
  36   } // end while
  37
  38   } // end if
  39   } // end for
``` for (x = 1; x < 1000; x++
if (x %2 == 0){
while (y < 100) {

PROXIES FOR VIEWING HIERARCHICAL DATA

BACKGROUND

The present invention relates to the field of user interfaces for computer programs and operating systems. Many computer programs and operating systems display items in hierarchical views. In a hierarchical view, items may have ancestor or descendant items. Typically, hierarchical views of items attempt to show the relationships between items and their ancestor and descendant items.

Typical user interfaces have difficulty in presenting clear hierarchical views for large number of items or deep hierarchies. For example, one common type of hierarchical view presents items in an outline format, with descendant items listed below and indented from their ancestor item. However, if an ancestor item includes a large number of descendant items, there may not be sufficient space within a window or on the display to show all of the descendant items. As a result, a user may have to vertically scroll the hierarchical view to view some of the descendant items of an ancestor item. As the hierarchical view is scrolled, one or more levels of ancestor items, representing the previous levels of the hierarchy, may scroll off-screen. When this occurs, the typical hierarchical view does not provide any indication of the currently displayed items' location in the hierarchy of items.

This problem is exacerbated when displaying deep hierarchies of items, which have many levels of ancestors and descendants. In these situations, a set of descendant items may have many levels of ancestor items. However, as the user scrolls through the set of descendant items, some or all of these ancestor items are scrolled off-screen. This removes the context of these descendant items location in the hierarchy from the user interface.

Therefore, there is an unmet need for a user interface to present hierarchical views of items to users that presents ancestor-descendant relationships regardless of the number of items in a display or the depth of the hierarchy.

BRIEF SUMMARY

An embodiment of the invention displays a hierarchical view of items. Items may be the ancestor or descendant of one or more other items. As an ancestor item having one or more visible descendant items is scrolled outside of the view, an embodiment of the invention automatically creates a proxy at the side of the view. The proxy corresponds with the ancestor item scrolled outside the display area. Multiple proxies may be displayed at the side of the view to fully present the ancestry of all visible items. In an embodiment, the proxies are arranged according to the hierarchy of their corresponding items. Items that do not have descendant items visible in the view, for example due to collapsed portions of the view, will not generate corresponding proxies. Conversely, in an embodiment, when an ancestor item is scrolled into the display, any corresponding proxies are automatically removed.

In an embodiment, the proxies may be active user interface elements, enabling users to select or manipulate a proxy to select or manipulate the corresponding ancestor item and its descendant items, and/or to act as a drop target for copying or moving items in the hierarchy, similar to items normally displayed in view.

In an embodiment, proxies remain visible in a view as long as at least one of its descendant items is within the display area, regardless of whether the list of items in a view are scrolled up or down.

BRIEF SUMMARY OF THE DRAWINGS

The invention will be described with reference to the drawings, in which.

In the drawings, identical reference numbers indicate identical components.

DETAILED DESCRIPTION

Figure 1:
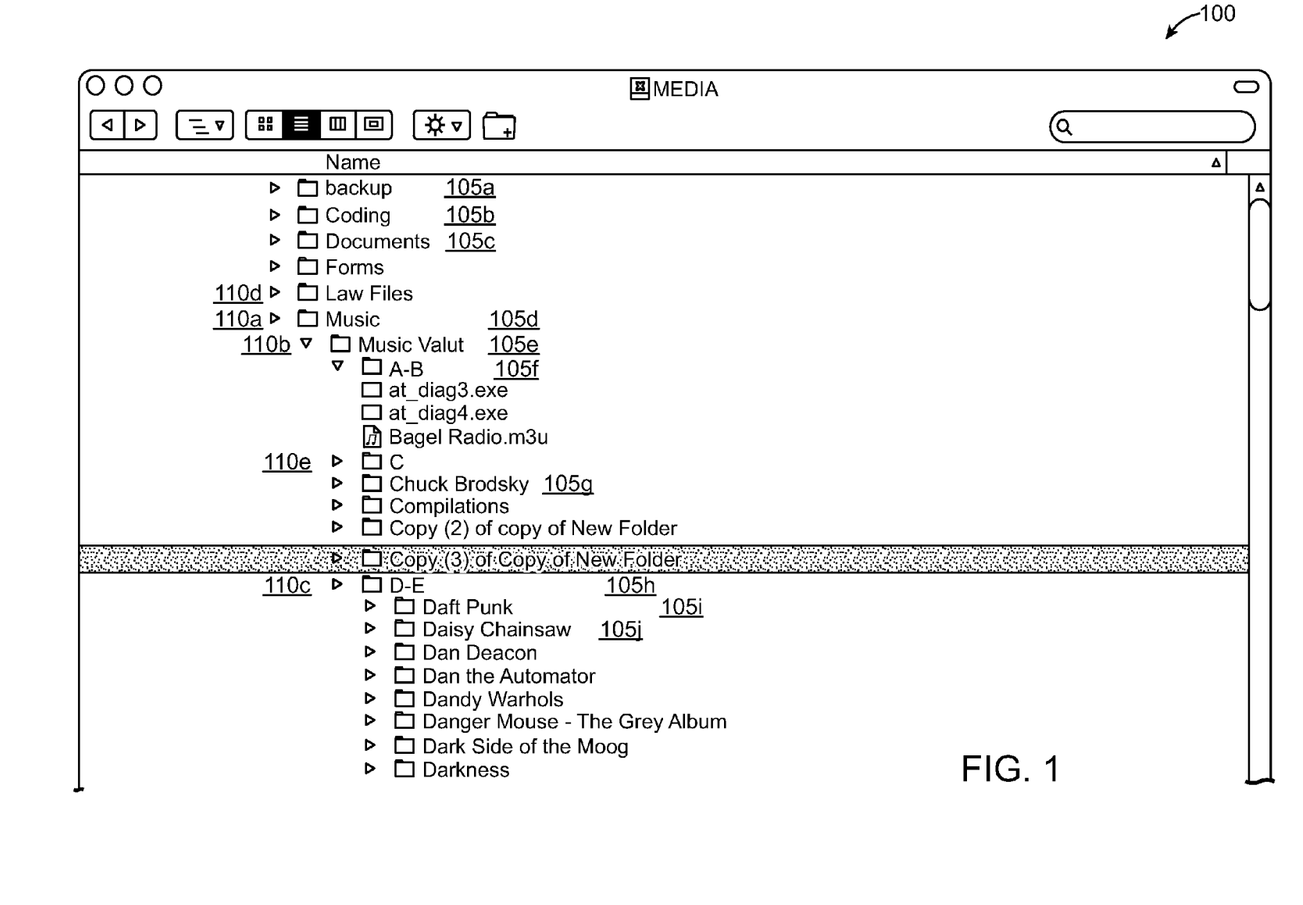
FIG. 1 illustrates an example display area of items at a top level of a hierarchy according to an embodiment of the invention.

FIG. 1 illustrates an example display area 100 of items at a top level of a hierarchy according to an embodiment of the invention. Display area 100 presents a list of items 105, with each item displayed on a separate line. Items 105 may represent any type of data in a computer system, including files and directories in a file system; classes and subclasses of an object-oriented data model; data objects and attributes; data or metadata within a database or file; structured lists and outlines of data; blocks of text; source code; network hierarchies; data flows and networks of computations and operations, such as animation variables, shading networks, and deformer networks; hierarchical calendars and project timelines. For example, display area 100 presents items representing files and directories in a file system, although embodiments of the invention may be applied to any other type of data in a computer system.

Display area 100 may display items 105 as text, icons, still or moving images, previews or representations of item content, and/or any combination thereof. Although omitted for clarity, each line of the display area may be divided into multiple columns to present different attributes of each item.

Items 105 may be related to other items by ancestor-descendant, container, or other relationships. Display area 100 presents a hierarchical view of the relationships between items. Although display area 100 presents a hierarchical view of item relationships, the items themselves are not necessarily arranged according to a strict hierarchy. For example, items may be related in a directed acyclic graph. In this example, an item may be displayed at two or more locations within a hierarchical view of item relationships.

In an embodiment, display area 100 displays children items below and indented from their respective parent items. For example, items 105a, 105b, 105c, and 105d are at the root level of a hierarchy and have no indentation. Item 105d, a folder labeled "Music," is the ancestor or container of item 105e, a folder labeled "Music Vault." This is indicated by the indentation of item 105e relative to item 105d. Each item may (or may not) be the ancestor or container for one or more items and may (or may not) itself be a descendant or contained by another item.

Display area 100 may be static or interactive. For example, if an item includes one or more descendant items, the display area 100 may present an expansion button 110 for the item. When a user activates an expansion button 110 of an item, the descendant items of this item are displayed with indentation according to their location in the hierarchy. For example, expansion button 110a of item 105d has been activated in the display area 100, revealing the descendant item 105e. Similarly, an expansion button 110b of item 105e has been activated, revealing the descendant items of item 105e, including items 105f, 105g, and 105h. Additionally, the expansion button 110c of item 105h has been activated, revealing descendant items of item 105h, including items 105i, 105j, and 105k. Conversely, expansion buttons 110d and 110e are in a deactivated state, which keeps their respective descendant items hidden in the display area 100.

Additionally, display area 100 may include other interactive behavior, depending upon the types of items and the type of application. For example, selecting an item may open a corresponding file or folder or start a corresponding application. In another example, items 105 may be moved, for example by dragging with a cursor, to change their location in the hierarchy. Items 105 may also server as drop targets for moving or copying data from other locations. One or more items 105 may be selected for editing, modification, or to define data operations.

Display area 100 includes a vertical scroll bar 115 for bringing off-screen items into view. For example, as the vertical scroll bar 115 is moved down, additional items are added from the bottom of the display area 100, while items at the top of the display area 100, such as items 105a and 105b, move upwards and off-screen. Scroll bar 115 may be operated via user input, such as input via a keyboard or mouse, or from another application.

In some cases, vertically scrolling the list of items in display area 100 will cause an item's ancestor items to move off-screen, making the location of the item in the hierarchy ambiguous. An embodiment of the invention compensates for this by automatically presenting the off-screen ancestor items as proxies in the display area. In general, if an item is visible in a display area and one or more of its ancestor items are not visible in the display area, then an embodiment of the invention automatically displays proxies in the display area corresponding with the ancestor items that are not visible in the display area. In one example of this embodiment, proxies are automatically added as an ancestor item of one or more items in a display area is scrolled off-screen. In a further example, proxies may be displayed in a vertical orientation to make use of the empty space created by the indentation of items in the display area.

Figure 2:
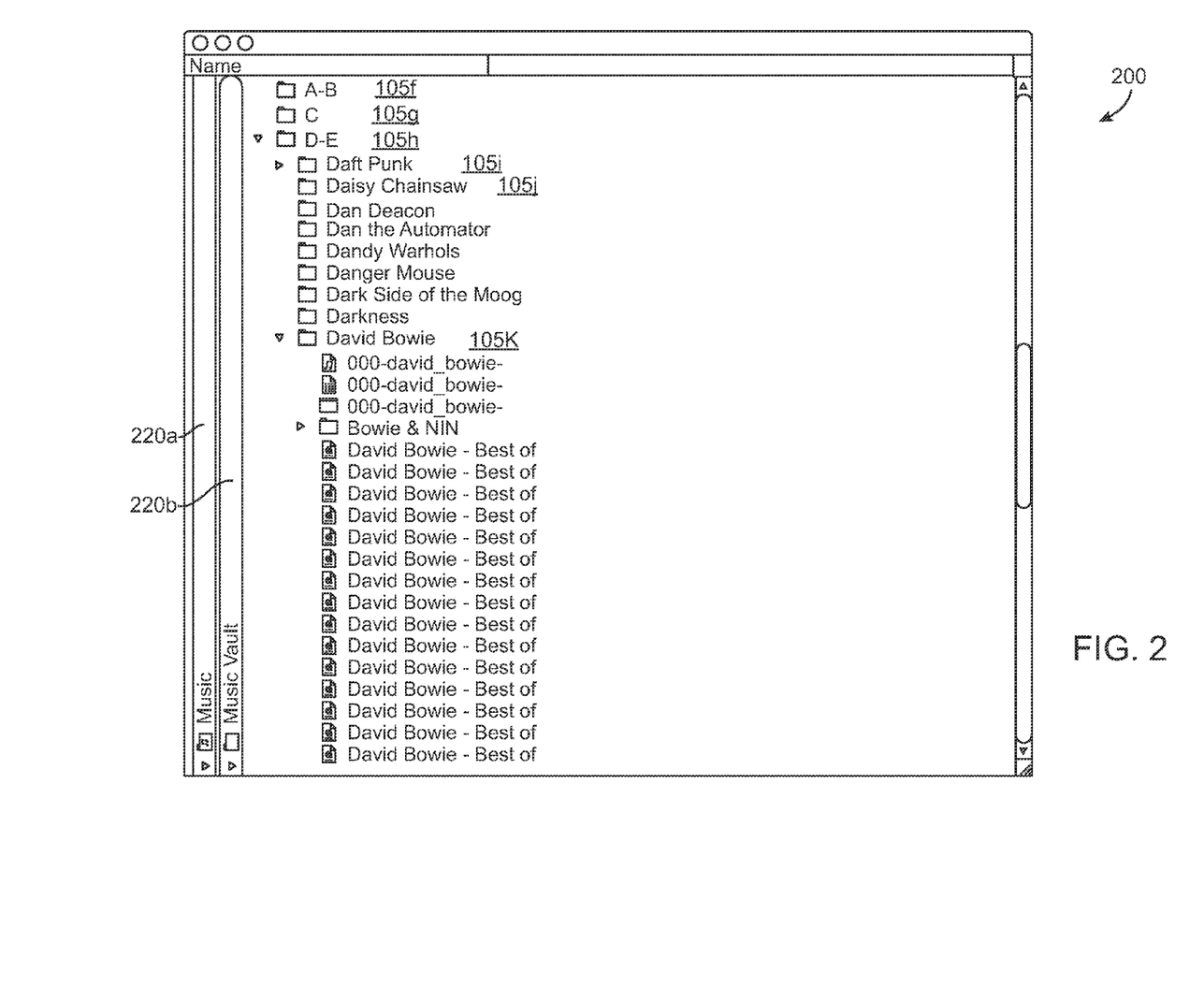
FIG. 2 illustrates an example display area of items at a third level of a hierarchy according to an embodiment of the invention.

FIG. 2 illustrates an example display area 200 of items at a third level of a hierarchy according to an embodiment of the invention. In this example, items 105a, 105b, 105c, 105d, and 105e from display area 100 have scrolled off-screen. Because items 105d and 105e are the ancestors of items 105f, 105g, and 105h, proxies 220a and 220b, representing items 105d and 105e, respectively, have been placed at the side of the display area 200. Conversely, because items 105a, 105b, and 105c do not have any children items visible in display area 200, these ancestor items do not have corresponding proxies in display area 200. In an embodiment, items that do not have any descendant items visible in the display area, for example due to collapsed portions of the hierarchical list, will not generate corresponding proxies when they are not visible in the display area.

In an embodiment, each of the proxies 220 displays the name and optionally other attributes of its corresponding item. For example proxy 220a displays the label "Music," which corresponds with the folder name associated with item 105d. In other embodiments, the proxies 220 may include icons, images, animation, graphical indicators, colors, or any other arbitrary presentation of any type of data. In an embodiment, the labels of proxies may be vertically orientated to conserve display space. In an embodiment, proxies representing items are stacked from left to right in hierarchical order, with the highest hierarchy level at the left. For example, proxy 220b is to the right of proxy 220a, indicating that the corresponding item 105e is the descendant of ancestor item 105d in display area 100.

In an embodiment, proxies 220 may be active user interface elements. For example, users can select one of the proxies 220 to scroll the display back to the first element within the corresponding level of the hierarchy of items. In another example, a user may select a proxy to select the corresponding ancestor item and its descendant items. In an example, a user may move or copy an ancestor item and its descendant items by selecting and manipulating the proxy corresponding with the ancestor item. In still another example, user may use proxies as drop target or drag source for copying or moving items in the hierarchy, similar to operations performed on items normally displayed in display area 100.

In an embodiment, proxies may have the same behaviors or functions as the items they represent. For example, if an item represents a folder, then a user may be able to drag an icon representing a file on to the item to move or copy the file to this folder. Similarly, in an embodiment, a user may be able to drag the icon representing the file on to the proxy corresponding with this item to move or copy the file to the associated folder.

In another embodiment, proxies may have different behaviors or functions than the items they represent. For example, an item may represent a line of source code in a listing of computer source code, as described in the example of FIGS. 8A-8E. If a user selects this item, an application may allow the user to edit or manipulate this line of source code. If the line of source code represented by the item is a control flow statement, such as a "for" program loop, an embodiment of the invention may add a proxy representing this line of source code if the item is scrolled out of view or is no longer visible. In this example, selecting the proxy representing the control flow statement may select all of the lines of source code within this program loop or branch, rather than just the line of source code including the control flow statement. This is an example of a proxy having different behavior than its corresponding item.

In an embodiment, proxies usually remain visible in a display area as long as their corresponding children items are visible in the display area, regardless of whether the list of items in a display area are scrolled up or down. However, scrolling the list of items in a display area may change the number and type of proxies presented in the display area. Other actions, such as resizing a display area or window; changing the size of items or their relative spacing; adding or removing items; or covering a portion of a display area may change the visibility of items and their ancestors within a display area. In an embodiment, proxies are automatically added or removed as the visibility of items and their ancestors in a display area is changed to preserve a view of the context of the displayed items within the hierarchy. For example, when an ancestor item of one or more items shown in a display area is scrolled off-screen, an embodiment of the invention automatically adds a proxy corresponding with the ancestor item to the side of the display area.

Embodiments of the invention may implement proxies using any software technique, including but not limited to graphics functions, objects, and libraries and user interface or widget functions, objects, and libraries. Additionally, a proxy may be implemented by creating a separate user interface element or object within a display area or by modifying the attributes of the user interface element or object representing the item to have the appearance and optionally the behavior of its proxy.

Figure 3:
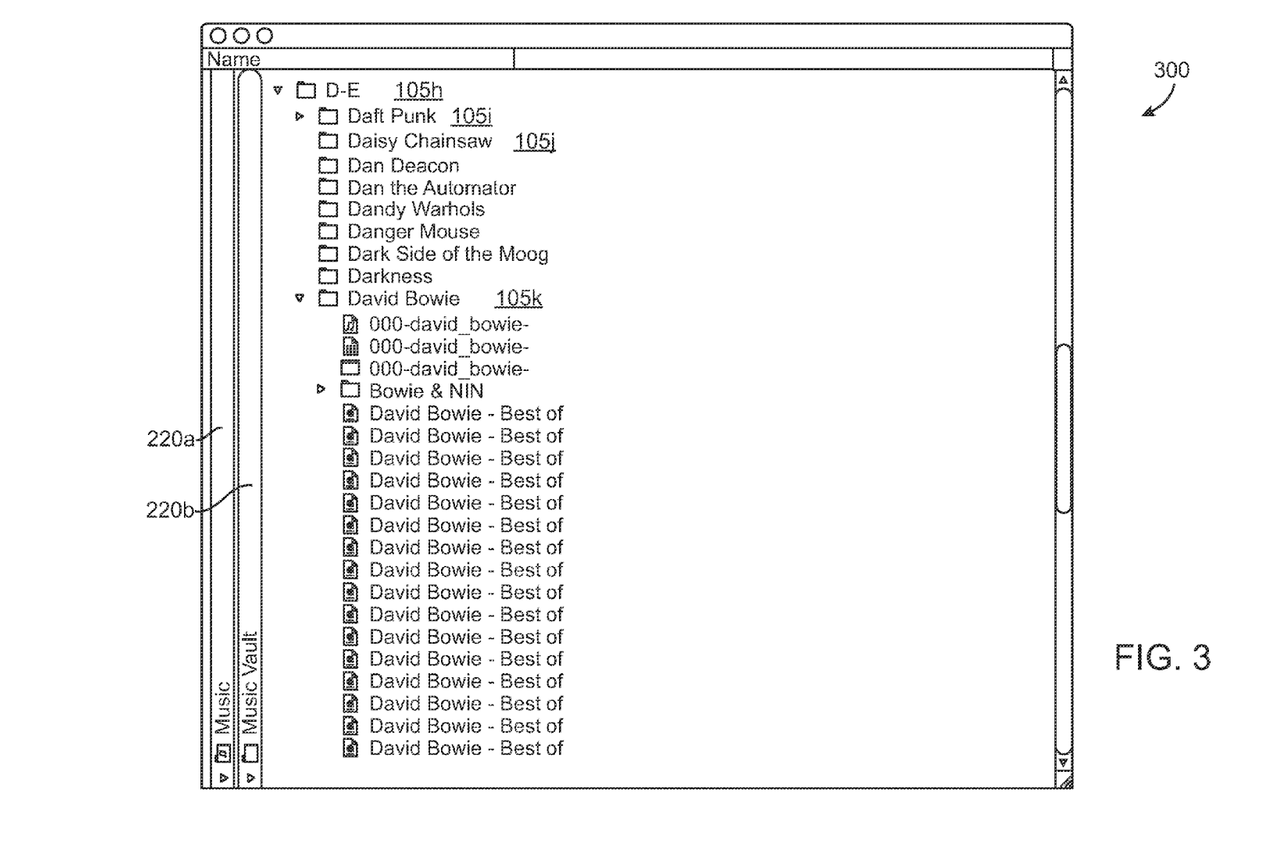
FIG. 3 illustrates an example display area of items before a transition to fourth level of a hierarchy according to an embodiment of the invention.

FIG. 3 illustrates an example display area 300 of items before a transition to a fourth level of a hierarchy according to an embodiment of the invention. Display area 300 includes items 105h, 105i, 105j, and 105k shown in display areas 100 and 200. Items 105a-105g in display area 100 have been scrolled off-screen in display area 300. Display area 300 also includes proxies 220a and 220b, representing the off-screen ancestor items 105d and 105e of item 105h.

Item 105h, representing a folder labeled "D-E," is at the top of display area 300. Thus, if the list of items in display area 300 is scrolled up any further, item 105h will be scrolled off-screen. Because item 105h is the ancestor of items such as item 105i, 105j, and 105k, an embodiment of the invention will automatically add a proxy corresponding with item 105h when item 105h is scrolled off-screen if any of its descendant items are visible in the outline.

Figure 4:
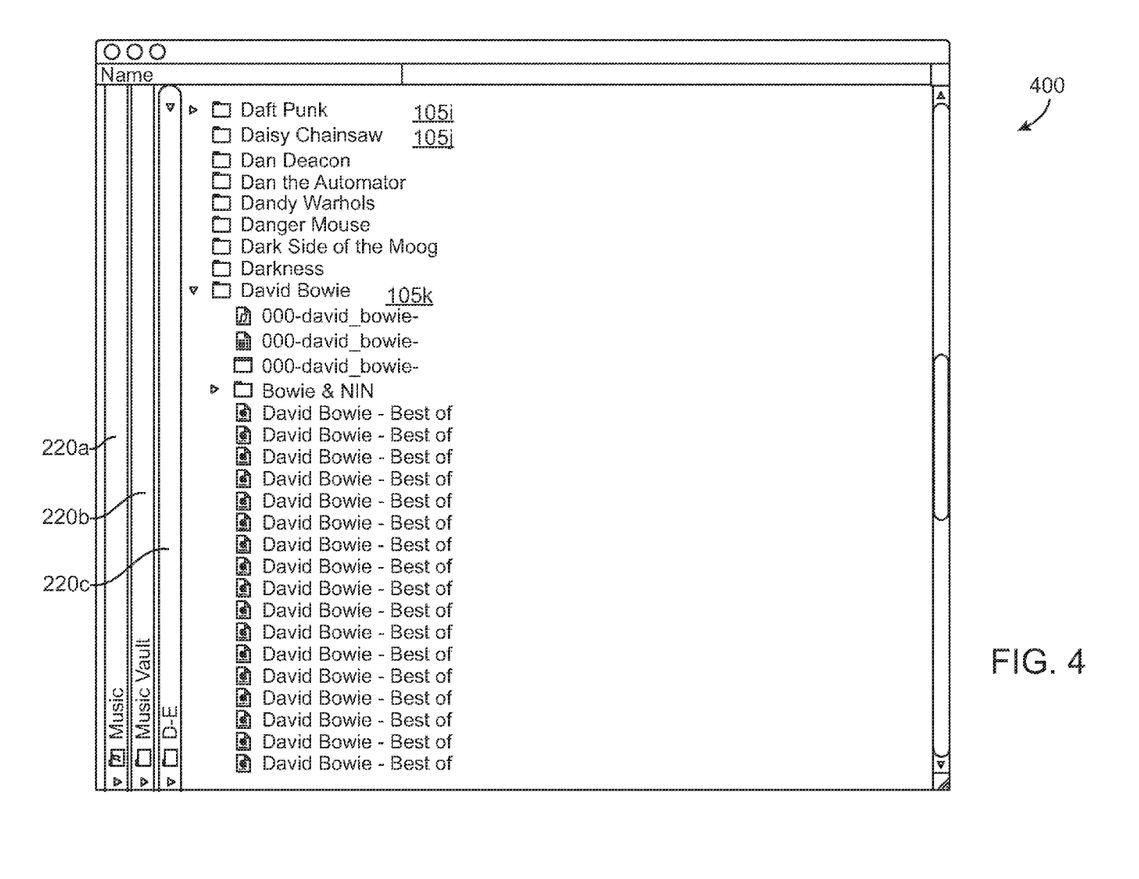
FIG. 4 illustrates an example display area of items at a fourth level of a hierarchy according to an embodiment of the invention.

FIG. 4 illustrates an example display area 400 of items at a fourth level of a hierarchy according to an embodiment of the invention. Display area 400 includes items 105i, 105j, and 105k shown in display areas 100 and 200. Items 105a-105h in display area 100 have been scrolled off-screen in display area 400. Because item 105h is an ancestor of items 105i, 105j, and 105k and is now off-screen in display area 400, proxy 220c corresponding with item 105h is added to display area 400.

Conversely, if the list of items in display area 400 is scrolled down so that ancestor item 105h reappears from off-screen, an embodiment of the invention automatically removes proxy 220c. As a result, the display area appears similar to display area 300.

In an embodiment, visual cues such as unique coloring, animation, or audio may be used to indicate the transition of an ancestor item from the top of a display area to a proxy, or vice-versa. For example, as the list of items in display area 300 is scrolled up and item 105h is moved off-screen, an animated sequence may show item 105h enlarging to the size of a proxy, rotating 90 degrees, and translating to the position of proxy 220c shown in display area 400.

Figure 5:
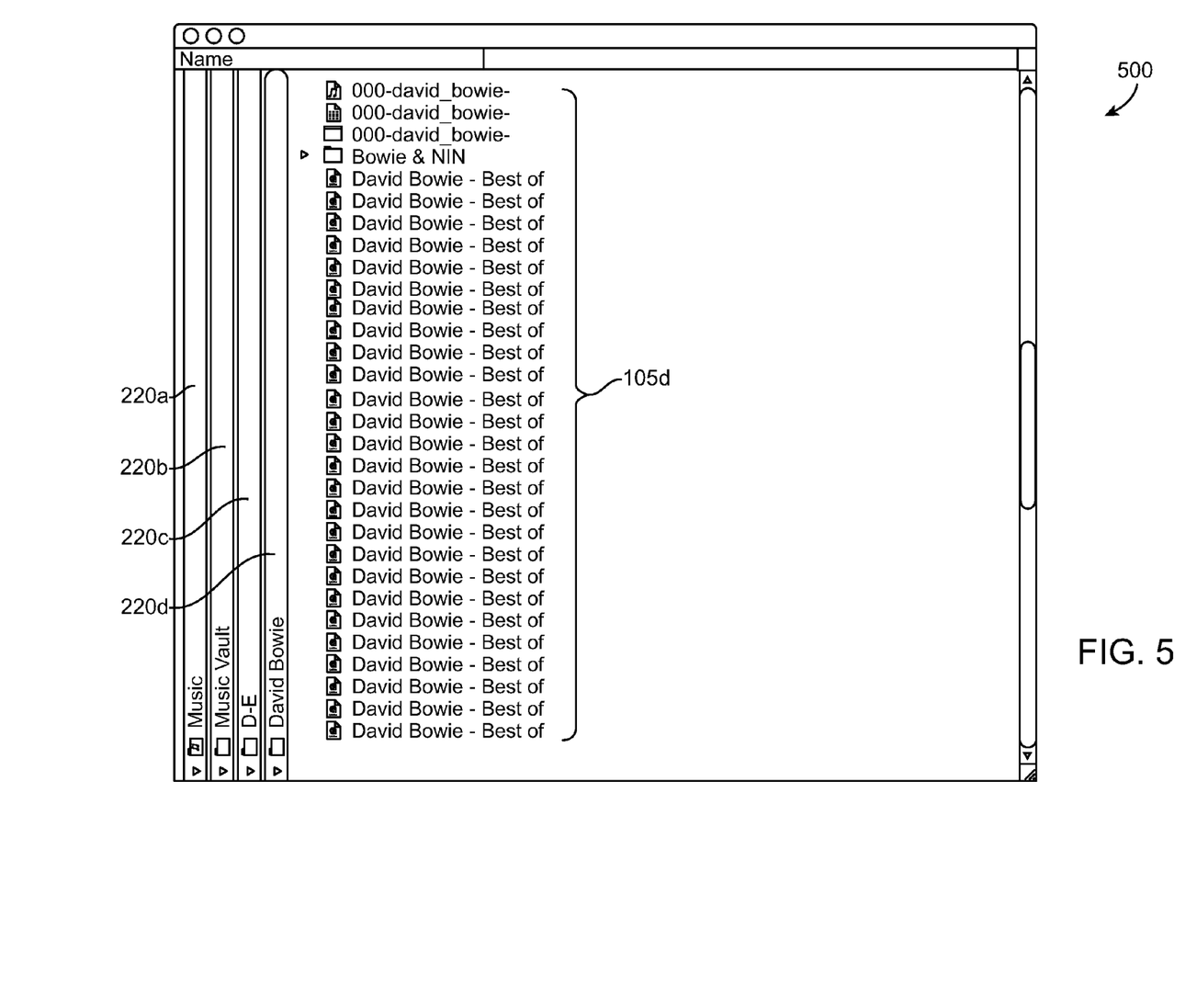
FIG. 5 illustrates an example display area of items at a fifth level of a hierarchy according to an embodiment of the invention.
Figure 6:
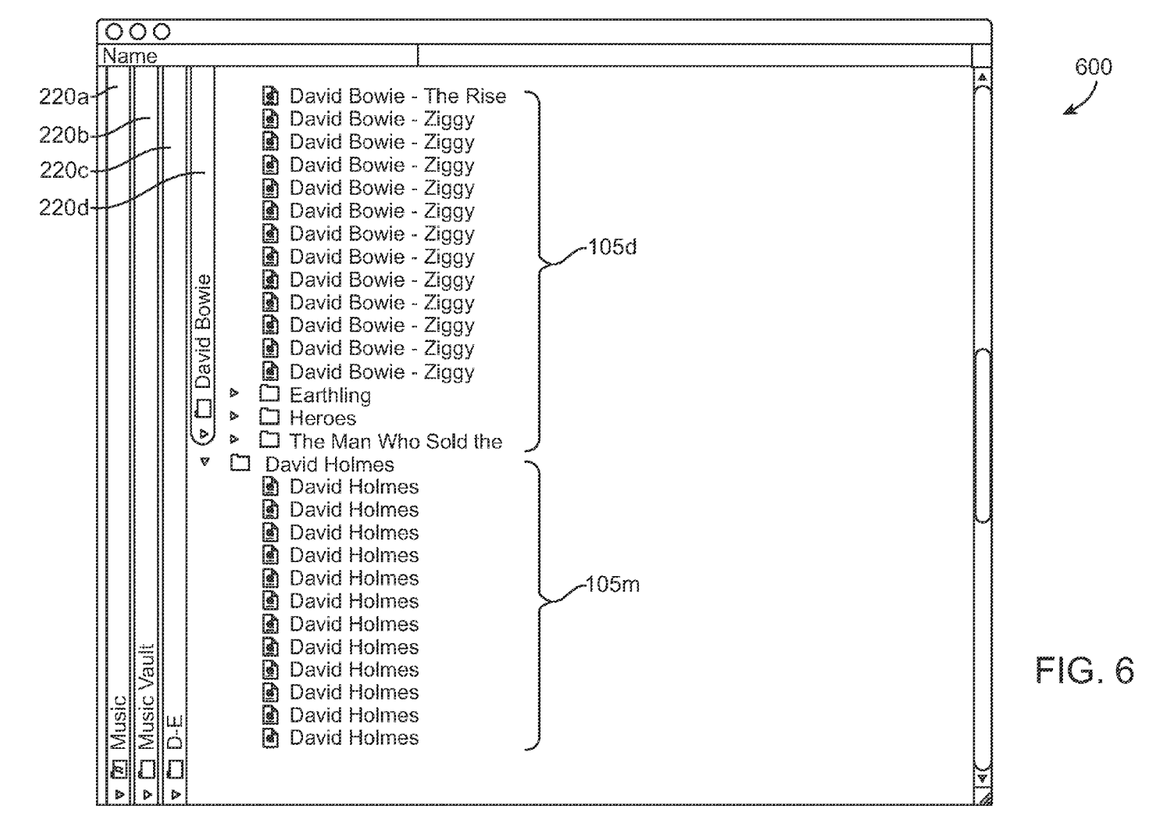
FIG. 6 illustrates an example display area of items during at a transition between sibling items at a fifth level of a hierarchy according to an embodiment of the invention.
Figure 7:
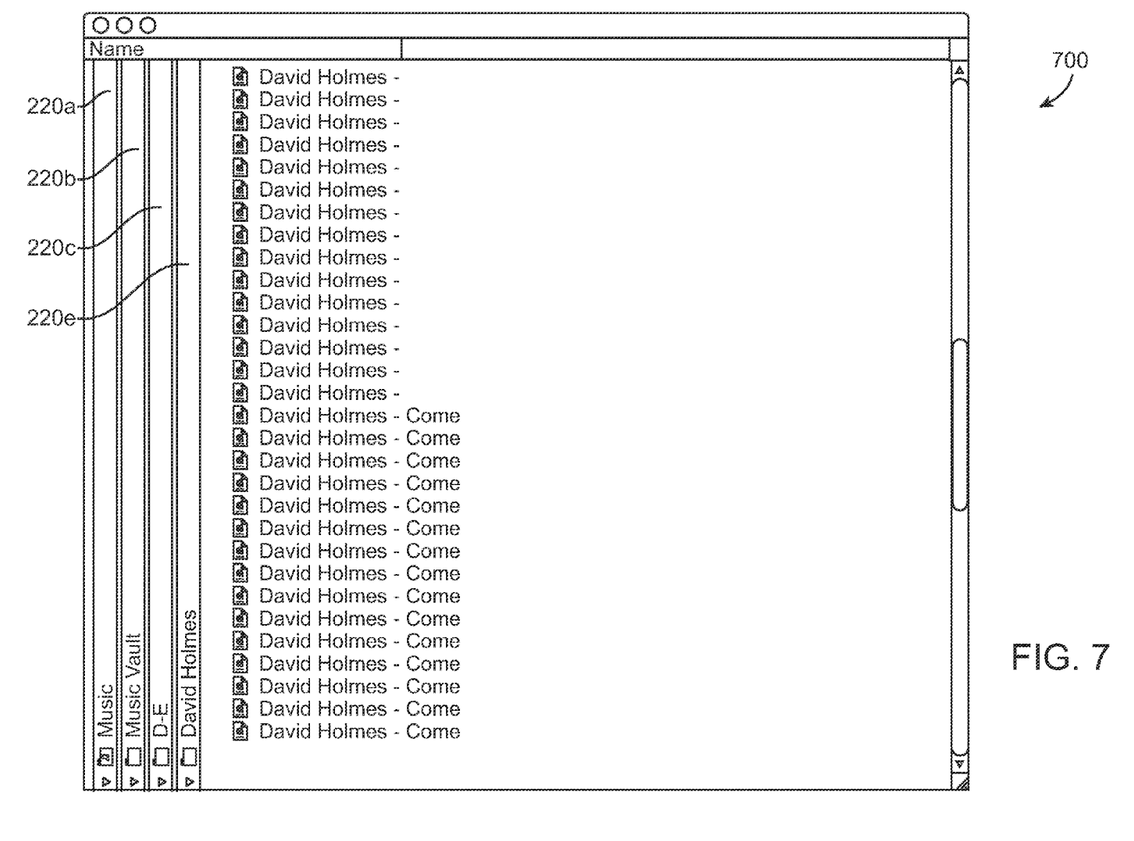
FIG. 7 illustrates an example display area of items after a transition between sibling items at a fifth level of a hierarchy according to an embodiment of the invention.

In some situations, as a user scrolls through a list of items, one proxy may be removed and shortly thereafter replaced with a different proxy. This can occur if two or more items in a display area have different ancestor items that have scrolled off-screen. FIGS. 5-7 illustrate an example of this situation.

FIG. 5 illustrates an example display area 500 of items at a fifth level of a hierarchy according to an embodiment of the invention. Items 105a-105k shown in the previous display areas have moved off-screen in display area 500. Display area 500 presents the set of items 105l, which are all descendants of the item 105k shown in the previous display areas. Display area 500 includes proxies 220a, 220b, 220c, and 220d, representing the ancestor items of the set of item 105l, including item 105d, the folder "Music"; item 105e, the folder "Music Vault"; item 105h, the folder "D-E"; and item 105k, the folder "David Bowie, respectively.

As the list of items is scrolled further up, additional items that are not descendants of item 105k, the folder "David Bowie," may be shown. FIG. 6 illustrates an example display area 600 of items during at a transition between sibling items at a fifth level of a hierarchy according to an embodiment of the invention. Example display area 600 includes a subset of the set of items 105l that are descendants of item 105k. Additionally, example display area 600 includes a set of items 105m that are the descendants of item 105n, the folder "David Holmes." Item 105n is a descendant of item 105h, the folder "D-E."

In an embodiment, a proxy's vertical extent and position may match or be proportional to the vertical extent and position of the visible descendants of the item that the proxy represents. For example, when a set of items having a common ancestor are scrolled towards the top (i.e. the vertical position of the items shifts up) and the top-most items scroll out of view, the vertical extent of the remaining visible items will decrease and their on-screen position will change. As a result, an embodiment of the invention similarly decreases the associated the proxy's vertical extent and/or changes its position.

In a further embodiment, a proxy to the immediate right of another proxy is logically a descendent of this proxy and thus shares this sizing and scrolling behavior. In still a further embodiment, this behavior may be constrained by user interface considerations, for example a minimum proxy size, so that a proxy always has a minimum size to maintain its legibility and utility to users.

For example, as the display area 600 is scrolled up further, the subset of the set of items 105l displayed becomes smaller and item 105n moves closer to the top of the display area. When item 105n reaches the top of the display area 600 and scrolls off-screen, an embodiment of the invention replaces proxy 220d with a new proxy representing the ancestor item 105n. This is shown as proxy 220e in the display area 700 of FIG. 7.

FIGS. 8A-8D illustrate another example application of an embodiment of the invention. Source code editors often present the source code of programs in a nested or hierarchical view within a display area, with different levels of the hierarchy indicating the control flow or structure of a program. For example, source code hierarchies can be used to indicate portions of the program code that belong to a subroutine or function, a conditional branch, or a program loop.

For large and complex programs, a user may lose track of a particular code portion's place in the control flow hierarchy. For example, a user may forget where a set of instructions are located in a set of nested loops and conditional branches. This confusion often leads to syntax errors and erroneous program behavior that is difficult and time-consuming to track down.

Figure 8A:
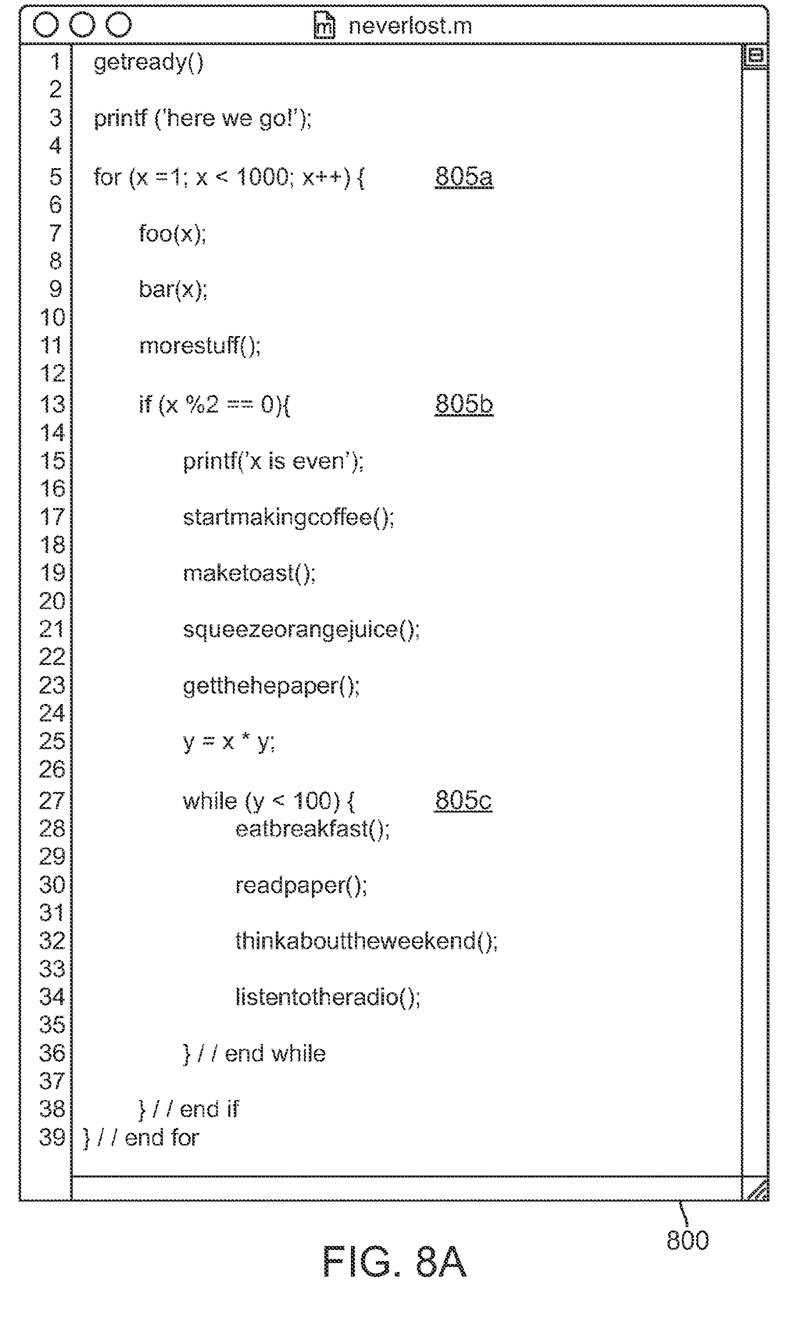
FIGS. 8A-8E illustrate another example application of an embodiment of the invention.

FIG. 8A illustrates a display area 800 displaying a portion of an example program source code. The portion of the source code in display area 800 includes a program loop 805a in the form of a "for" loop statement. Within this program loop 805a, there is a conditional branch 805b in the form of an "if" statement. Conditional branch 805b includes a second program loop 805c in the form of a "while" loop.

Figure 8B:
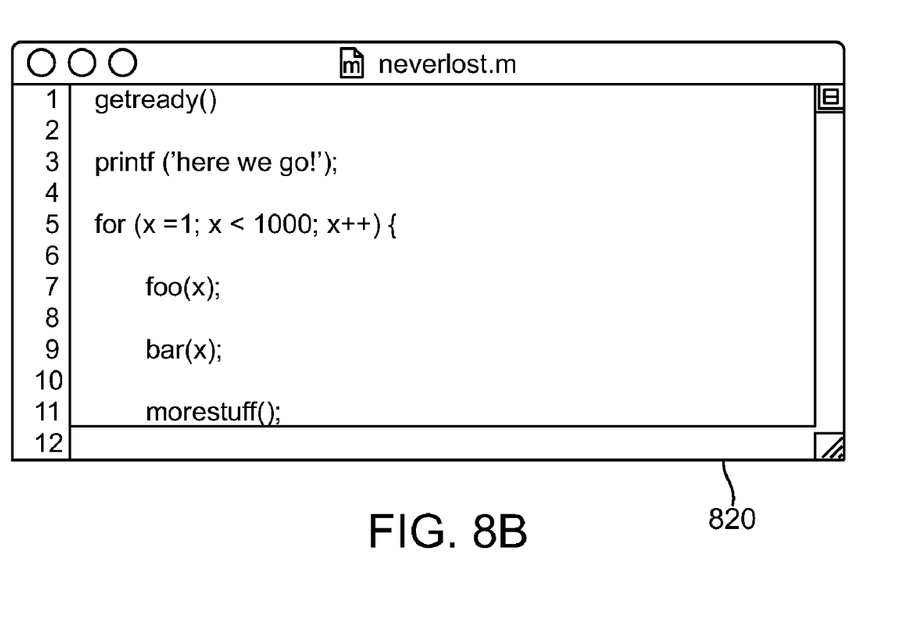

FIG. 8B illustrates a second display area 820 displaying this example source code. Display area 820 displaying the example source code has been decreased in size compared with display area 800. However, the display area 820 displaying the example source code is set at the top of the example source code, so that the context of the visible portion of the example source code in display area 820 is apparent.

Figure 8C:
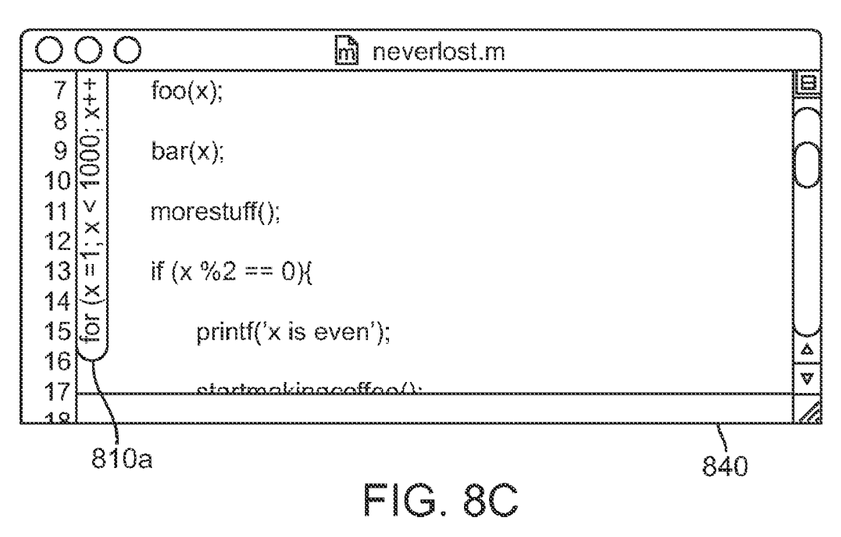

FIG. 8C illustrates a third display area 840 displaying this example source code. In display area 840, the program loop 805*a*, which is the "for" loop, has scrolled off-screen. As a result, an embodiment of the invention adds a proxy 810*a* corresponding with the program loop 805*a*. In this example, proxy 810*a* includes all or a portion of the source code line associated with the program loop 805*a* to indicate the context of the source code visible in display area 840. In this example, the proxy is located at the side of the display area; however, alternative embodiments may position proxies in any other locations in the display area, such as at the top of the display area.

Figure 8D:
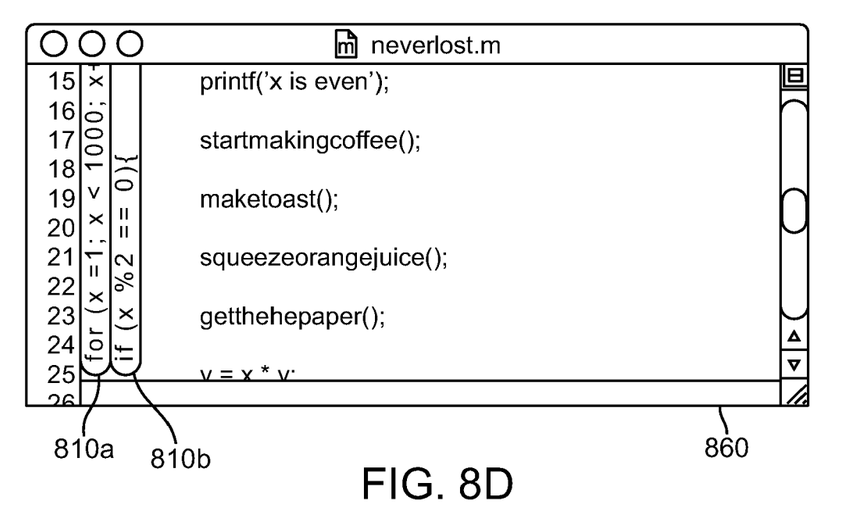

Continuing with this example, FIG. 8D illustrates a fourth display area 860 displaying this example source code. In display area 860, the user has scrolled the source code up further so that the conditional branch statement 805*b* is off-screen. As a result, an embodiment of the invention adds a proxy 810*b* corresponding with the conditional branch 805*b*. Because conditional branch 805*b* is part of (i.e. a descendant of) the program loop 805*a*, display area 860 still includes the proxy 810*a* corresponding with the program loop 805*a*.

In display area 860, users can refer to the proxies 810*a* and 810*b* to remind themselves that the source code displayed in the display area is part of the program loop 805*a* and the conditional branch 805*b*.

Figure 8E:
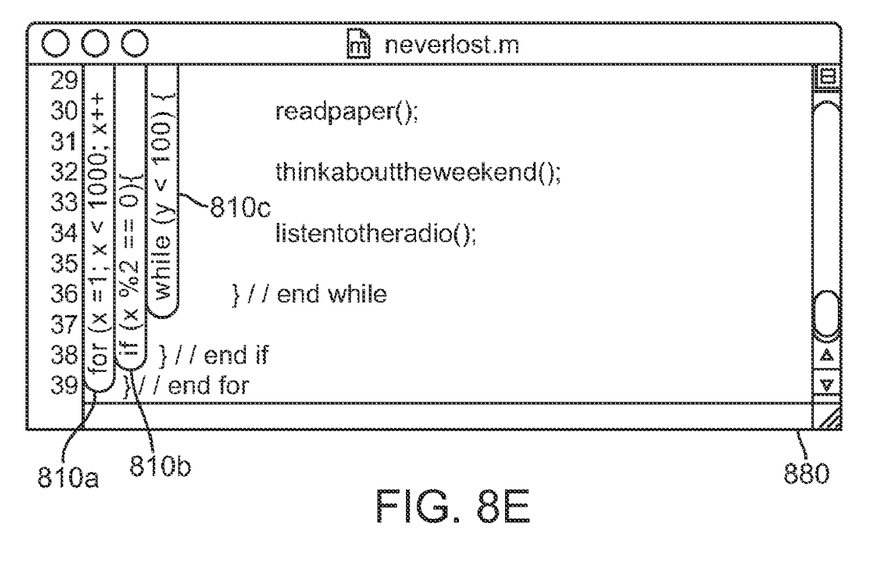

Similarly, FIG. 8E illustrates a fourth display area 880 displaying this example source code. In display area 880, the user has scrolled the source code up further so that the program loop statement 805*c* is off-screen. An embodiment of the invention adds a proxy 810*c* corresponding with the program loop 805*c*. Because the program loop statement 805*c* is part of (i.e. a descendant of) the conditional branch 805*b* and program loop 805*a*, display area 880 still includes the proxies 810*a* and 810*b* corresponding with the program loop 805*a* and conditional branch statement 805*b*.

In display area 880, users can refer to the proxies 810*a*, 810*b*, and 810*c* to remind themselves that the source code displayed in the display area is part of the "for" program loop 805*a*, the "if" conditional branch 805*b*, and the "while" program loop 805*c*.

Similar to the embodiment described above, an embodiment of the invention keeps the proxies 810 of the control flow structures 805 visible in a display area as long as any program code associated with these control flow structures is also visible in the display area. An embodiment automatically removes or adds proxies as associated source code becomes visible or not visible in a display area, such as when source code is scrolled into or out of the display area. Additionally, visual cues may be used to indicate the transition of a control flow statement from the side or top of a display area to a proxy, or vice-versa.

Furthermore, proxies 810 may be active user interface elements. For example, users can select one of the proxies 810 to scroll the display area back to the beginning of the corresponding control flow statement, such as the function declaration, conditional branch declaration, or the program loop initialization. In another example, a user may select a proxy to select the corresponding control flow statement and any included source code. For example, a user may select proxy 810*c* to select the entire source code of this "while" program loop. A user may then move or copy this portion of the source code elsewhere in the same display area or a different program window.

Figure 9:
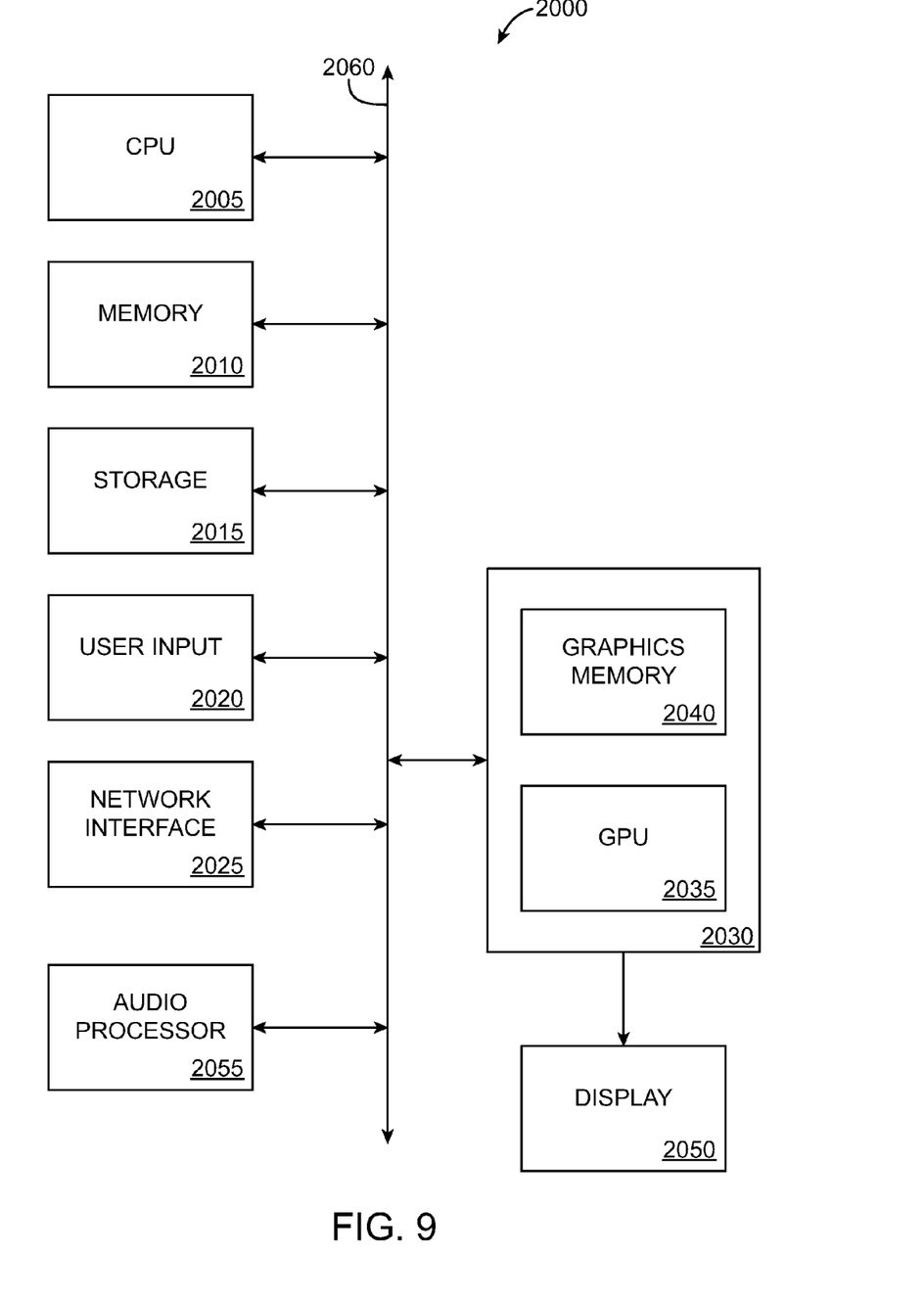
FIG. 9 illustrates an example computer system suitable for implementing embodiments of the invention.

FIG. 9 illustrates an example computer system 2000 suitable for implementing embodiments of the invention. FIG. 9 is a block diagram of a computer system 2000, such as a personal computer, video game console, personal digital assistant, other digital device, or other information processing device suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer lets, touch pads, touch screens, still or video cameras, motion sensors, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to a renderfarm or a set of server computers, each similar to computer system 2000, via the network interface 2025 or storage 2015. The renderfarm generates one or more rendered images of the scene using the provided instructions and/or data. These rendered images may be stored on computer-readable media in a digital format and optionally returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can further include one or more programmable execution units capable of executing shader programs. GPU 2035 can be comprised of one or more graphics processing unit cores.

The CPU 2005, renderfarm, and/or GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays, as well as film recorders adapted to reproduce computer generated images on photographic film. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005. In still further embodiments, all or a portion of the graphics subsystem 2030 may be omitted and software executed by CPU 2005 may perform the functions of the graphics subsystem 2030.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of displaying items associated with a hierarchy, the method comprising:
   receiving items to be displayed;
   displaying a first item associated with a first hierarchy level within a display area adapted to present at least a subset of the items;
   displaying a second item associated with a second hierarchy level within the display area, wherein the second item is a descendant of the first item;
   determining if the first item is not visible in the display area and the second item is visible in the display area; and
   in response to the determination that the first item is not visible in the display area and the second item is visible in the display area, displaying a proxy in the display area corresponding with the first item, wherein the proxy in the display area identifies the first item as an ancestor of the second item when the first item is not visible in the display area.

2. The method of claim 1, wherein the first item includes a label and the proxy includes the label.

3. The method of claim 2, wherein the proxy displays the label in a vertical orientation.

4. The method of claim 1, wherein displaying the proxy comprises:
   placing the proxy adjacent to a second proxy, wherein the second proxy corresponds with a third item associated with a third hierarchy level greater than the first hierarchy level, wherein the first item is a descendant of the third item.

5. The method of claim 4, wherein the proxy and the second proxy are arranged in an order corresponding with their associated hierarchy levels.

6. The method of claim 1, wherein the proxy is located at the side of the display area.

7. The method of claim 6, wherein the proxy is located within an indentation associated with at least the second item.

8. The method of claim 1, wherein the proxy is located at the top of the display area.

9. The method of claim 1, wherein displaying the proxy further comprises:
   removing a second proxy corresponding with a third item associated with the first hierarchy level, wherein the second item is not a descendant of the third item.

10. The method of claim 1, displaying the proxy further includes:
    displaying an animated transition between the first item and the proxy.

11. The method of claim 1, wherein the proxy is an active user interface element.

12. The method of claim 11, further comprising:
    selecting a portion of the items that are descendants of the first item in response to receiving a selection of the proxy.

13. The method of claim 11, further comprising:
    performing an operation on a portion of the items that are descendants of the first item in response to receiving a selection of the proxy.

14. The method of claim 11, associating an additional item as a descendant of the first item in response to receiving a selection of the proxy.

15. The method of claim 1, further comprising:
    receiving an indication of a change in the display area; and
    in response to the indication, determining if the first item is not visible in the display area and the second item is visible in the display area.

16. The method of claim 15, wherein the change in the display area is selected from a group consisting of:
    a change in size of the display area; a change in display size of the items; a change in spacing between the items; an addition of at least one item to the items; a removal of at least one of the items; covering a portion of the display area; and scrolling the display area to change the subset of the items presented in the display area.

17. The method of claim 1, further comprising:
    changing the subset of the items presented in the display area;
    determining if the first item has moved inside of the display area in response to the change in the subset of the items and the second item is visible in the display area; and
    in response to the determination that the first item has moved inside of the display area and the second item is visible in the display area, removing the proxy from the display area.

18. The method of claim 1, wherein the items are selected from a group consisting of:
    files and directories in a file system; classes and subclasses of an object-oriented data model; data objects and attributes; data or metadata within a database or file; structured lists and outlines of data; source code; text blocks; network hierarchies; data flows and networks of computations and operations; animation variables; deformer networks; shading networks; and hierarchical calendars and project timelines.

* * * * *